United States Patent [19]

Bose

[11] 3,744,262
[45] July 10, 1973

[54] METHOD FOR COOLING THERMOFORMED PLASTIC PARTS

[76] Inventor: Robert N. Bose, 1015 Naperville Road, Wheaton, Ill. 60187

[22] Filed: June 30, 1971

[21] Appl. No.: 158,401

[52] U.S. Cl............ 62/62, 62/514, 425/243, 425/388, 62/384, 164/126
[51] Int. Cl........................... F25d 25/00
[58] Field of Search............... 425/243, 384, 388, 425/DIG. 9; 164/126, 89; 62/514, 62, 121, 384

[56] References Cited
UNITED STATES PATENTS

| | | |
|---|---|---|
| 3,257,820 | 6/1966 | Case et al. .................... 62/514 X |
| 3,269,133 | 8/1966 | Dixon ............................ 62/514 X |
| 3,281,075 | 10/1966 | Smyes, Jr. ...................... 62/514 X |
| 3,293,877 | 12/1966 | Barnes ........................... 62/514 X |
| 3,516,122 | 6/1970 | Schwartz ...................... 425/388 X |
| 3,633,381 | 1/1972 | Haaf et al. ...................... 62/514 X |

*Primary Examiner*—Robert L. Spicer, Jr.
*Attorney*—Raymond E. Fidler Edmond T. Patnaude et al.

[57] ABSTRACT

Thermoformed plastic parts are cooled before removal from the mold by enclosing an area adjacent to the part and introducing liquid carbon dioxide to the confined area through metering orifices.

3 Claims, 6 Drawing Figures

INVENTOR
ROBERT N. BOSE
BY
ATTORNEYS

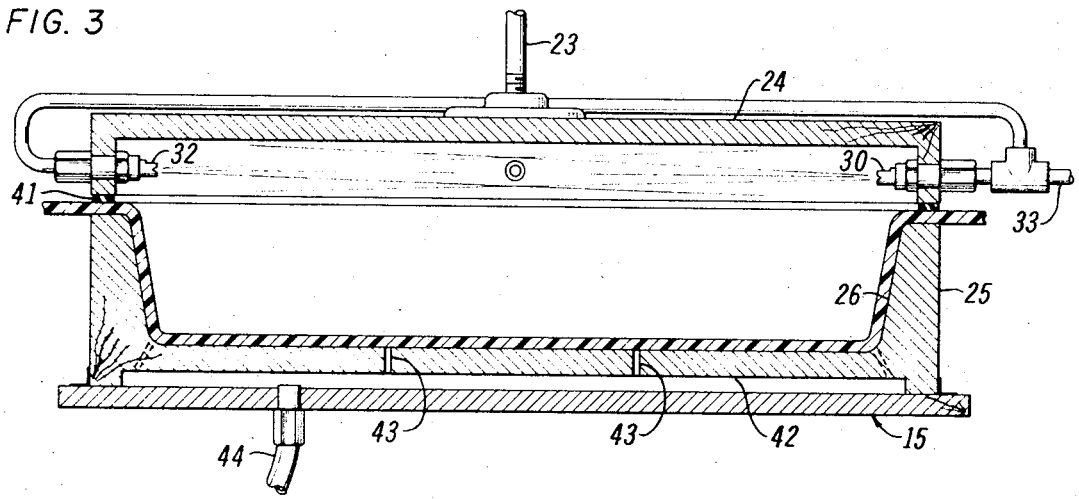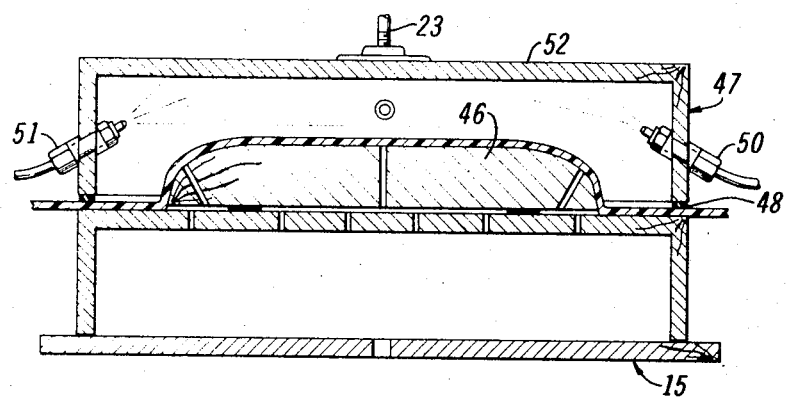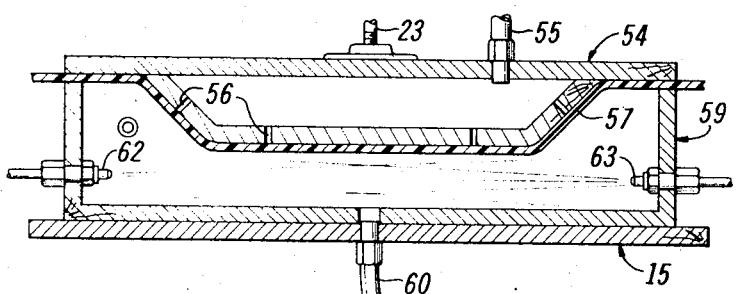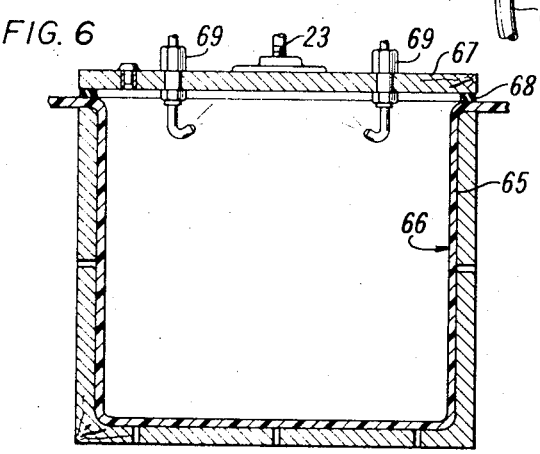

METHOD FOR COOLING THERMOFORMED PLASTIC PARTS

The present invention generally relates to the art of cooling freshly molded plastic parts, and it relates more particularly to a new and improved method and apparatus which enables the use of carbon dioxide for extracting heat from a thermoformed plastic part while it is in position against the mold surface.

In U.S. Pat. No. 3,065,501, Gasmire first disclosed a system using carbon dioxide to cool a freshly molded plastic part formed in a blow molding operation, and the advantages attained by using carbon dioxide as a coolant in blow molding systems have now been widely recognized and accepted. Nevertheless, carbon dioxide has not been successfully used for cooling thermoformed plastic parts. Rather, air is sometimes blown directly against the freshly molded part and in other cases water is sprayed onto the part to cool it. While these techniques have accelerated the cooling of the molded parts, it would be desirable to further decrease the required cooling time thereby reducing the cost of manufacturing thermoformed plastic parts.

Therefore, an object of the present invention is to provide a new and improved method and apparatus utilizing carbon dioxide to cool thermoformed plastic parts.

Another object of this invention is to provide a method and apparatus which may be used to provide faster and more uniform cooling of thermoformed parts than has been provided by the prior art.

A further object of the present invention is to provide a new and improved system for controlling the flow of carbon dioxide to an area to be cooled.

Briefly, the above and further objects may be realized in accordance with the present invention by enclosing the exposed surface of the molded part with a cover or hood and introducing liquid carbon dioxide through controlled orifice sprays to the confined area.

Further objects and advantages and a better understanding of the present invention may be had by reference to the following detailed description taken in connection with the accompanying drawings, wherein:

FIG. 3 is a cross-sectional view of a portion of the machine of FIG. 1 showing the cooling hood in place over a molded part;

FIG. 4 is a cross-sectional view of another embodiment of this invention for use where the part is molded over a male mold;

FIG. 5 is a cross-sectional view of another embodiment of this invention for use in a snap-back molding system; and FIG. 6 is a cross-sectional view of still another embodiment of the invention for use where the molded part has a large cavity therein.

Figure 1:
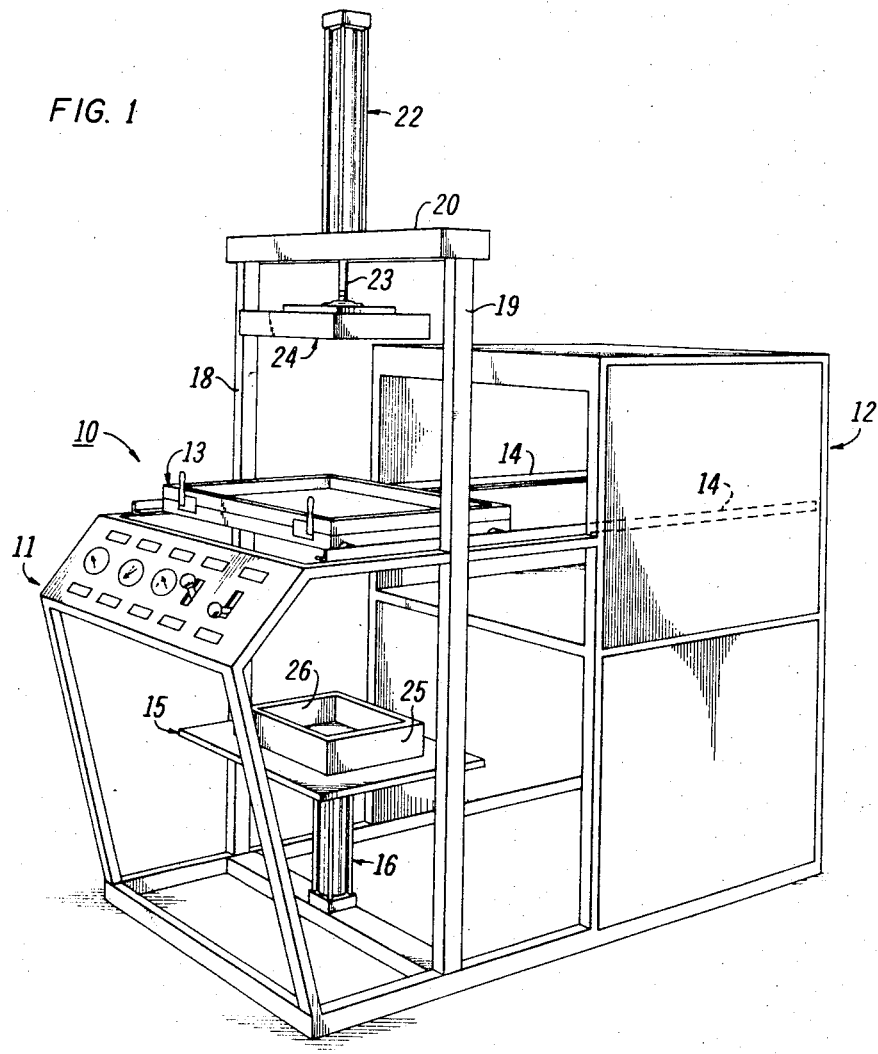
FIG. 1 is a perspective view of a thermoforming machine embodying the present invention.

Referring now to the drawings and particularly to FIG. 1 thereof, there is illustrated a thermoforming machine 10 comprising as its principal elements a control panel 11 at the front, an oven section 12 at the rear, a clamp frame 13 reciprocable in a horizontal direction along a track 14 between the forward loading and unloading position as illustrated and a rear heating position within the oven 12; and a platen 15 mounted on a cylinder 16 for vertical movement between an upper molding position and the lower plastic sheet loading and unloading position illustrated in the drawing. The frame of the machine 12 includes a pair of upright members 18 and 19 across the top of which a horizontal crosspiece 20 is suitably secured as by welding. A pneumatic cylinder 22 is mounted on top of the crosspiece 20 and a bar 23 which is connected to the piston element of the cylinder assembly 22 extends downwardly through a suitable opening in the crosspiece 20. Fixedly secured to the lower end of the bar 23 is a rectangular hood 24. As shown, a mold member 25 having an upwardly opening mold cavity 26 is mounted on the platen 15.

The various parts of the thermoforming machine 10 which are conventional are not shown in the drawing in order to facilitate a better understanding of the present invention. It will be understood, however, that the machine 10 includes various timers, control valves, pressure and vacuum connections, as well as heating elements in the oven 12 and the controls therefor.

During a typical operating cycle of the machine 10, the clamp frame 13 is opened, a previously molded part having been removed therefrom, and a sheet of thermoformable plastic is placed in the clamp frame. The clamp frame is then closed and moved into the oven 12 wherein the plastic sheet is heated to a moldable state. When the temperature of the plastic sheet has reached the moldable temperature, the clamp frame is moved forwardly along the rails 14 out of the oven to the illustrated molding position. The cylinder 16 is then actuated to elevate the platen 15 and thus the mold 25 upwardly into the molding position wherein the upper surface of the mold 25 tightly engages the plastic sheet within the clamp frame 13. A vacuum is then drawn through a plurality of passageways extending through the mold 25 to the cavity 26 therein to create a differential pressure across the plastic sheet which is thereby sucked by the vacuum tightly against the mold surfaces defining the cavity 26. The cylinder 22 is then actuated to lower the hood 24 into engagement with the portions of the plastic sheet which overlie the upper edges of the mold 25. With the hood 24 thus in place, liquid carbon dioxide is metered into the cavity defined by the hood 24 and the freshly molded plastic part. As the liquid carbon dioxide vaporizes, heat is absorbed thereby from the plastic part thus cooling it to a temperature at which it is able to retain its shape as determined by the mold cavity 26. The platen 15 is then lowered to move the mold 25 away from the molded part and the cylinder 22 is operated to elevate the hood 24 away from the molded part. The clamp frame 13 may then be opened and the molded part removed. Another sheet of plastic material is then placed in the clamp frame 13, the clamp frame locked in the closed position, and the above described cycle is repeated to mold another part.

Figure 2:
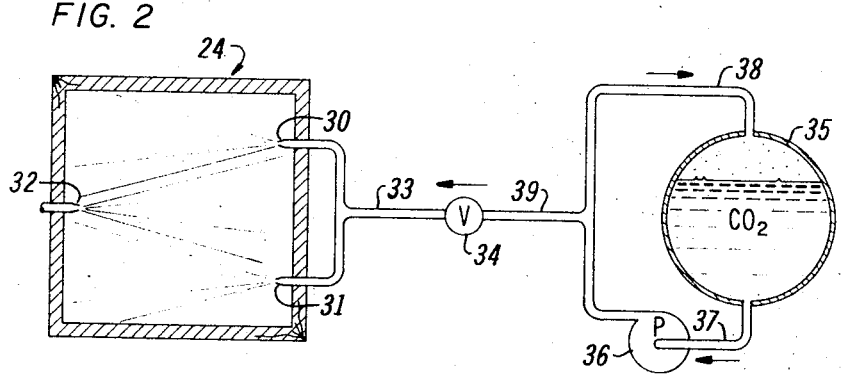
FIG. 2 is a cross-sectional view of a portion of the machine of FIG. 1 and showing the carbon dioxide supply system in schematic form.

Referring now to FIG. 2, it may be seen that in the illustrated embodiment of the invention, three nozzles 30, 31 and 32 are mounted by and extend through the side walls of the hood 24. The nozzles 30, 31 and 32 each produce a fan-shaped pattern extending in a substantially horizontal direction. Accordingly, the liquid carbon dioxide which is sprayed from the nozzles 30, 31 and 32 is not directed against the molded part but against the opposite side wall of the hood 24. Moreover, the metering rates of the nozzles are selected such that the carbon dioxide does not leave a residue of solid carbon dioxide in or on the part whereby more uniform cooling of the freshly molded part is achieved. The nozzles 30, 31 and 32 are interconnected by suitable tubing which is connected through a tube 33 to a solenoid control valve 34. The inlet to the valve 34 is connected by a line 39 to a conventional carbon dioxide loop including a liquid vapor pressure tank 35, a pump 36, a line 37 connected between the bottom of the tank 35 and the inlet to the pump 36, and a line 38 connected between the outlet from the pump 36 to the top of the tank 35. During the time that the machine 10 is in operation, the pump 36 is continually operated to recirculate liquid $CO_2$ from the bottom of the tank 35 to the top thereof. Except for the time when liquid $CO_2$ is being fed to the nozzles 30, 31 and 32, the valve 34 is closed and, depending upon the ambient temperature and the length of the line 39, some of the liquid carbon dioxide immediately upstream of the valve 34 will vaporize. When the hood 24 has been placed over the freshly molded part and the valve 34 is opened there is an inherent time delay between the opening of the valve and the actual spraying of liquid carbon dioxide through the nozzles 30, 31 and 32. The extent of this time delay is determined by the length of the conduit 33 between the outlet from the valve 34 and the nozzles 30, 31 and 32, the size of the orifices 30, 31 and 32 and, as previously mentioned, the amount of $CO_2$ vapor upstream of the valve 34. These are all controllable parameters which, together with the time in the cycle when the valve 34 is opened, determine the time and rapidity with which the part is cooled. Moreover, by a proper selection of the orifice size and patterns from the nozzles 30, 31 and 32, all of the evaporation of the carbon dioxide is made to take place within the hood 24 thus assuring uniform cooling of the molded part which is located therebelow.

Referring to FIG. 3, it may be seen that the hood 24 is provided with a soft gasket 41 mounted on its lower edge to prevent damage to the molded part when the hood is moved against it. Preferably this gasket is porous to prevent the build-up of a substantial pressure within the cavity defined by the hood 24 and the molded part. In some circumstances as more particularly described hereinafter it may be desirable to provide a pressure relief valve in the hood or cover member to assure against the build-up of excessive pressures. As also shown in FIG. 3, the mold 26 is provided with a recess 42 in its lower surface which is connected to the mold surface 26 by a plurality of small passageways 43. A vacuum connection 44 extends through the platen 15 into the space defined by the recess 42 to provide a vacuum on the lower surface of the plastic sheet thereby to move it into engagement with the mold surface 26 as illustrated in FIG. 3. The spray pattern from the nozzles 30, 31 and 32 are best illustrated in FIGS. 2 and 3, FIG. 2 showing the horizontal pattern and FIG. 3 showing the vertical pattern from these nozzles.

Referring to FIG. 4, there is shown another use of the present invention wherein a male mold member 46 is mounted on the platen 15 and a hood 47 is mounted on the rod 23 from the piston of the upper cylinder assembly 22. A cushion strip 48 is mounted along the bottom edges of the hood 47 for engagement with the plastic part and a plurality of nozzles 50 and 51 extend through the side walls of the hood 47 and are directed toward the horizontal upper wall 52 thereof. The nozzles 50 and 51 are suitably interconnected by manifold tubing and connected to the line 33 from the valve 34 (FIG. 2). When the part to be cooled has been formed over a male mold it is necessary that the sides of the hood extend farther down to provide an adequate space above the molded part in which the liquid carbon dioxide may vaporize to prevent nonuniform cooling of the part. It will be appreciated, however, that if selected cooling of any particular part or parts of the molded part is desired than one or more inlet nozzles may be aimed directly at the part to be preferentially cooled. Ordinarily, however, uniform cooling is desired and, therefore, the liquid carbon dioxide is vaporized within the cavity rather than on the surface of the part.

Referring now to FIG. 5, there is illustrated an application of the present invention to a snap-back molding system. In this type of thermoforming the heated plastic part is initially drawn by a vacuum into a cavity thereby to physically stretch the sheet. Thereafter the mold member is moved over the sheet and the vacuum is drawn therein to draw the previously stretched sheet against the mold surface. In this type of molding, a mold member 54 is secured to the rod 23 from the upper cylinder assembly 22 and is provided with a suitable connection 55 to a vacuum source. A plurality of passageways 56 extend to the male mold surface to draw a plastic sheet 57 against the mold surface. A rectangular frame 59 is mounted on the lower platen 15 and a suitable connection 60 for supplying a vacuum or a pressure to the cavity within the frame 59 is provided. In this case, it is necessary that the cavity or chamber within the frame 59 be sealed from the atmosphere so that when a vacuum is drawn through the line 60 the plastic sheet 57 is pulled and stretched downwardly into the cavity within the frame 59.

In order to cool the plastic 57 after it has been formed onto the mold surface as illustrated, a plurality of inlet nozzles 62 and 63 extend through the side walls of the frame 59 and are connected to the outlet port of the valve 34. As illustrated, the nozzles 62 and 63 are located below the surface of the plastic part to be cooled so that there is no direct impingement of the liquid carbon dioxide thereon. Rather, the liquid carbon dioxide vaporizes within the cavity in the frame 59 thereby to effect uniform cooling of the part 57.

Referring to FIG. 6, there is shown still another embodiment of the present invention wherein the thermoformed part or article 65 has a very large cavity 66 therein. In order to cool such a part, a flat cover member 67 is attached to the rod 23 from the cylinder assembly 22 and includes a cushion type gasket 68 around the periphery thereof for engagement with the upper edge of the molded part. A plurality of nozzles 69 suitably connected to the outlet port of the valve 34 are provided and are aimed back against the inner surface of the cover member 67. If desired, the nozzles 69 may be aimed toward one another so that the spray patterns therefrom interfere with one another to prevent any liquid carbon dioxide from actually engaging the part. As in the case of the other embodiments of the invention it is preferable that the flow rate to the nozzles 69 be controlled so that the carbon dioxide does not leave any residual solid carbon dioxide within the cavity 66.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A method of cooling a thermoformed plastic part while said part is still in position against the mold surface where it was formed, comprising the steps of confining the surface of said plastic part remote from said mold by means of a cover to provide an enclosed space partially defined by said surface, and spraying liquid carbon dioxide into said space in a direction toward said cover away from said part.

2. A method according to claim 1 wherein said spraying step is carried out by spraying said liquid carbon dioxide from a plurality of locations to cause the carbon dioxide sprays from said locations to intercept one another within said space and break up the particles of carbon dioxide in said sprays.

3. A method according to claim 1 wherein said space is at approximately atmospheric pressure during the introduction of carbon dioxide therein.

* * * * *